United States Patent
Oveyssi

(10) Patent No.: US 6,856,491 B1
(45) Date of Patent: Feb. 15, 2005

(54) PIVOT BEARING CARTRIDGE INCLUDING CENTRAL PIVOT ELEMENT AND BALL BEARING SET

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/741,786

(22) Filed: Dec. 19, 2003

Related U.S. Application Data

(62) Division of application No. 10/010,012, filed on Nov. 30, 2001, now abandoned.

(51) Int. Cl.$^7$ ................................................ G11B 5/55
(52) U.S. Cl. .................... 360/265.2; 384/610; 310/67 R
(58) Field of Search .......................... 360/265.2–265.6, 360/97.01–97.03, 98.07, 98.08, 99.04; 310/67 R; 384/453, 536, 610, 615

(56) References Cited

U.S. PATENT DOCUMENTS

| | | |
|---|---|---|
| 1,059,313 A | 4/1913 | Perkins |
| 4,265,498 A | 5/1981 | Luce et al. |
| 5,486,054 A * | 1/1996 | Nagata et al. ............. 384/610 |
| 5,487,612 A | 1/1996 | Anderson |
| 5,510,940 A | 4/1996 | Tacklind et al. |
| 5,598,048 A | 1/1997 | Dunfield et al. |
| 5,835,309 A | 11/1998 | Boutaghou |
| 6,069,766 A | 5/2000 | Battu et al. |
| 6,078,475 A | 6/2000 | Lawson |
| 6,406,191 B1 | 6/2002 | Koyama et al. |
| 6,411,471 B1 | 6/2002 | Liu et al. |

OTHER PUBLICATIONS

"Jewel Bearings Solve Light Load Problems" Machine Design, Oct. 26, 1989, pp 111–114.

* cited by examiner

*Primary Examiner*—Angel Castro
(74) *Attorney, Agent, or Firm*—Won Tae C. Kim, Esq.; Milad G. Shara, Esq.; Stetina, Brunda, Garred & Brucker

(57) ABSTRACT

A pivot bearing cartridge for use in a head stack assembly. The pivot bearing cartridge includes a pivot shaft including a shaft body and a shaft distal end. The pivot bearing cartridge further includes a cap disposed about the pivot shaft. The cap includes a cap annular body and a cap closed end. The pivot bearing cartridge further includes a ball bearing set in mechanical communication with the pivot shaft and the cap annular body. The pivot bearing cartridge further includes a central pivot element disposed between and in mechanical communication with the shaft distal end and the cap closed end for facilitating rotation of the cap relative to the pivot shaft.

14 Claims, 8 Drawing Sheets

PIVOT BEARING CARTRIDGE INCLUDING CENTRAL PIVOT ELEMENT AND BALL BEARING SET

CROSS-REFERENCE TO RELATED APPLICATIONS

This patent application is a divisional application of and claims priority to U.S. patent application Ser. No. 10/010,012 filed on Nov. 30, 2001 now abandoned, the contents of which are incorporated herein by reference.

BACKGROUND OF THE INVENTION

1. Field of the Invention

The present invention relates generally to pivot bearing cartridges use in head stack assemblies, and more particularly to a pivot bearing cartridge including a central pivot element and a ball bearing set.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms that extend from an opposite side of the actuator body. A head gimbal assembly includes at least one transducer head, sometimes two, which is distally attached to each of the actuator arms. The actuator assembly includes the actuator body which has a bore and a pivot bearing cartridge engaged within the bore. The at least one head gimbal assembly and the flex circuit cable assembly are attached to the actuator assembly.

The pivot bearing cartridge typically includes a pivot shaft having a threaded end, a pivot sleeve, and vertically separated upper and lower ball bearing sets mounted upon the pivot shaft which facilitate rotational attachment of the pivot sleeve to the pivot shaft. The pivot sleeve is disposed within the bore of the actuator body for allowing the pivoting of the actuator assembly. The threaded end of the pivot shaft used to mount the pivot bearing cartridge, and therefore the actuator assembly, to the disk drive base. Each ball bearing set includes inner and outer ball bearing races which encase a plurality of ball bearings. The inner ball bearing races engage the pivot shaft and the outer ball bearing races engage the pivot sleeve. This configuration allows for rotational movement of the outer ball bearing races relative to the inner ball bearing races for rotation of the pivot sleeve. The upper and lower ball bearing sets are pre-loaded in compression to maintain the pivot sleeve in position with respect to the pivot shaft.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications and standard form factors for such components, and may result in installation or assembly difficulties. As such reduced sized disk drives may have applications in hand held or mobile electronic devices, the specifications may even be tighter as compared to personal computer applications. For example, those specifications related to susceptibility to damage resulting from shock.

One particular area of focus is the reduction of the height of the pivot bearing cartridge as this limits the over all sizing of the head stack assembly. In a typical configuration, the pivot bearing cartridge height may be a function of the upper and lower ball bearing set arrangement. The mere reduction of the sizing of the upper and lower ball bearing sets impacts the susceptibility to damage resulting from shock, potential use of non-standard form factor bearings and difficulties conforming to allotted space requirements for such bearings. Accordingly, there is a need in the art for an improved pivot bearing cartridge configuration in comparison to the prior art.

SUMMARY OF THE INVENTION

An aspect of the invention can be regarded as a pivot bearing cartridge for use in a head stack assembly. The pivot bearing cartridge includes a pivot shaft including a shaft body and a shaft distal end. The pivot bearing cartridge further includes a cap disposed about the pivot shaft. The cap includes a cap annular body and a cap closed end. The pivot bearing cartridge further includes a ball bearing set in mechanical communication with the pivot shaft and the cap annular body. The pivot bearing cartridge further includes a central pivot element disposed between and in mechanical communication with the shaft distal end and the cap closed end for facilitating rotation of the cap relative to the pivot shaft.

The central pivot element may be of various shapes. In this regard, the central pivot element may be a ball bearing, or may be generally conical shaped. The central pivot element may be formed of various materials such as a metal material or a jewel material.

The ball bearing set is preferably preloaded in compression. The ball bearing set may include an inner race and an outer race, and the inner race may be attached about the shaft body and the outer race is attached within the cap annular body.

In an embodiment of the present invention, the pivot shaft includes a shaft pivot element seating cup adjacent the shaft distal end, and the central pivot element is disposed against the shaft pivot element seating cup. The pivot shaft may include a shaft distal end insert attached to the pivot shaft adjacent the shaft distal end, and the shaft pivot element seating cup may be formed in the shaft distal end insert. The shaft distal end insert may be formed to move along a longitudinal axis of the pivot shaft and biased against the central pivot element. The pivot shaft may include a spring in mechanical communication with the shaft body and the shaft distal end insert for biasing the shaft distal end insert against the central pivot element. The pivot shaft may include a damping element in mechanical communication with the shaft body and the shaft distal end insert for damping movement of the shaft distal end insert. The damping element may be preloaded in compression for biasing the shaft distal end insert against the central pivot element. The shaft pivot element seating cup may be an opening having an opening diameter less than a pivot element diameter of the central pivot element.

In another embodiment of the present invention, the cap includes a cap pivot element seating cup adjacent the cap closed end, and the central pivot element is disposed against the cap pivot element seating cup. The cap may include a cap closed end insert attached to the cap adjacent the cap closed end, and the cap pivot element seating cup may be formed in the cap closed end insert. The cap closed end insert may be formed to move along a longitudinal axis of the pivot shaft and biased against the central pivot element. The cap may include a spring in mechanical communication with the cap closed end insert for biasing the cap closed end insert against the central pivot element. The cap may include a damping element in mechanical communication with the cap annular body and the cap closed end insert for damping movement of the cap closed end insert. The damping element may be preloaded in compression for biasing the cap closed end insert against the central pivot element. The cap pivot element seating cup may have an opening having an opening diameter less than a pivot element diameter of the central pivot element.

In an embodiment of the present invention, the pivot shaft includes a shaft flat surface adjacent the shaft distal end, and the central pivot element is disposed against the shaft flat surface. The pivot shaft may include a shaft distal end insert attached to the pivot shaft adjacent the shaft distal end, and the shaft flat surface may be formed upon the shaft distal end insert. The shaft distal end insert may be formed to move along a longitudinal axis of the pivot shaft and biased against the central pivot element. The pivot shaft may include a spring in mechanical communication with the shaft body and the shaft distal end insert for biasing the shaft distal end insert against the central pivot element. The pivot shaft may include a damping element in mechanical communication with the shaft body and the shaft distal end insert for damping movement of the shaft distal end insert. The damping element may be preloaded in compression for biasing the shaft distal end insert against the central pivot element.

In an embodiment of the present invention, the cap includes a cap flat surface adjacent the cap closed end, and the central pivot element is disposed against the cap flat surface. The cap may include a cap closed end insert attached to the cap adjacent the cap closed end, and the cap flat surface may be formed upon the cap closed end insert. The cap closed end insert may be formed to move along a longitudinal axis of the pivot shaft and biased against the central pivot element. The cap may include a spring in mechanical communication with the cap closed end insert for biasing the cap closed end insert against the central pivot element. The cap may include a damping element in mechanical communication with the cap annular body and the cap closed end insert for damping movement of the cap closed end insert. The damping element may be preloaded in compression for biasing the cap closed end insert against the central pivot element.

In addition, the central pivot element may be attached to the shaft distal end. Alternatively, the central pivot element may be attached to the cap closed end. The pivot bearing cartridge may be of a fixed shaft arrangement. Alternative, the pivot bearing cartridge may be of a rotating shaft arrangement. In this regard, the pivot bearing cartridge further comprises a shaft base and an outer annular member extending from the shaft base and about the cap annular body, and the pivot shaft extends from the shaft base. The ball bearing set is in mechanical communication with the pivot shaft via the outer annular member and the shaft base. The ball bearing set may include an inner race and an outer race, and the inner race may be attached about the cap annular body and the outer race is attached within the outer annular member.

In addition, according to another aspect of the present invention, there is provided a disk drive including a disk drive base and rotatably couple head stack assembly that includes an actuator body and a pivot bearing cartridge according to an above described embodiment. The actuator body is provided with a bore and the pivot bearing cartridge is disposed within the bore. As the pivot bearing cartridge may be provided with a pivot bearing cartridge cap, the pivot bearing cartridge cap may be utilized as a pivot sleeve for engaging the bore.

DESCRIPTION OF THE PREFERRED EMBODIMENTS

Figure 1:
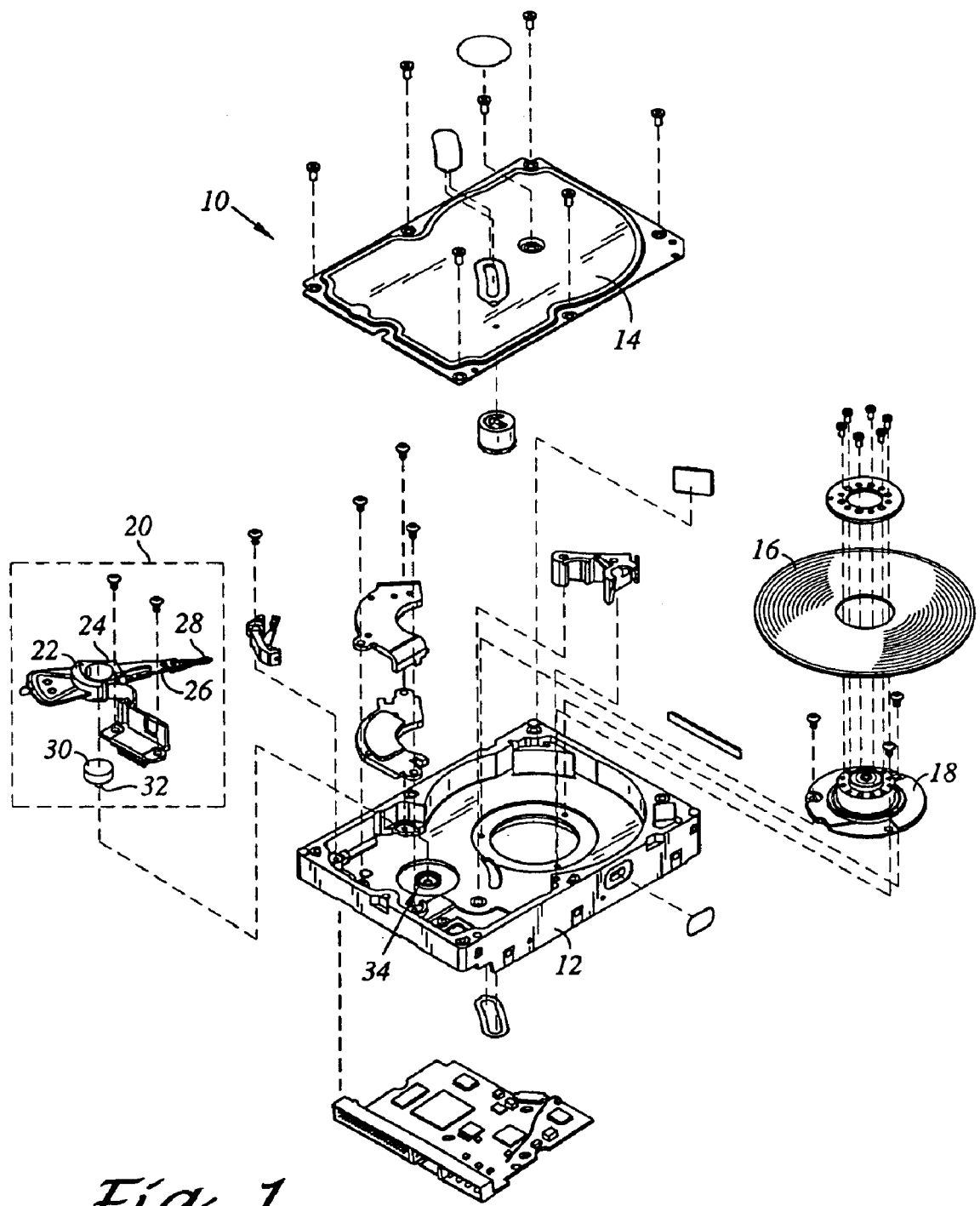
FIG. 1 is an exploded perspective view of a disk drive including a pivot bearing cartridge as constructed in accordance with an aspect of the present invention.

Referring now to the drawings wherein the showings are for purposes of illustrating preferred embodiments of the present invention only, and not for purposes of limiting the same, FIGS. 1–18 illustrate a disk drive and pivot bearing cartridge in accordance with the aspects of the present invention.

Referring now to FIG. 1 there is depicted an exploded perspective view of a disk drive 10 constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16. The disk 16 contains a plurality of tracks for storing data. The head disk assembly further includes a spindle motor 18 for rotating the disk 16 and a head stack assembly 20.

The head stack assembly 20 includes an actuator assembly which includes an actuator body 22 having a bore 24. An actuator arm 26 extends from the actuator body 22. A head 28 is attached from a distal end of the actuator arm 26. The actuator assembly further includes a pivot bearing cartridge 30 which is disposed within the bore 24 of the actuator body 22. The pivot bearing cartridge 30 may have a threaded end 32 which engages a threaded hole 34 in the disk drive base 12. The pivot bearing cartridge 30 facilitates rotation of the actuator assembly so as to move the head 28 relative to the disk 16 for reading and writing operations with respect to the tracks contained on the disk 16.

Figure 2:
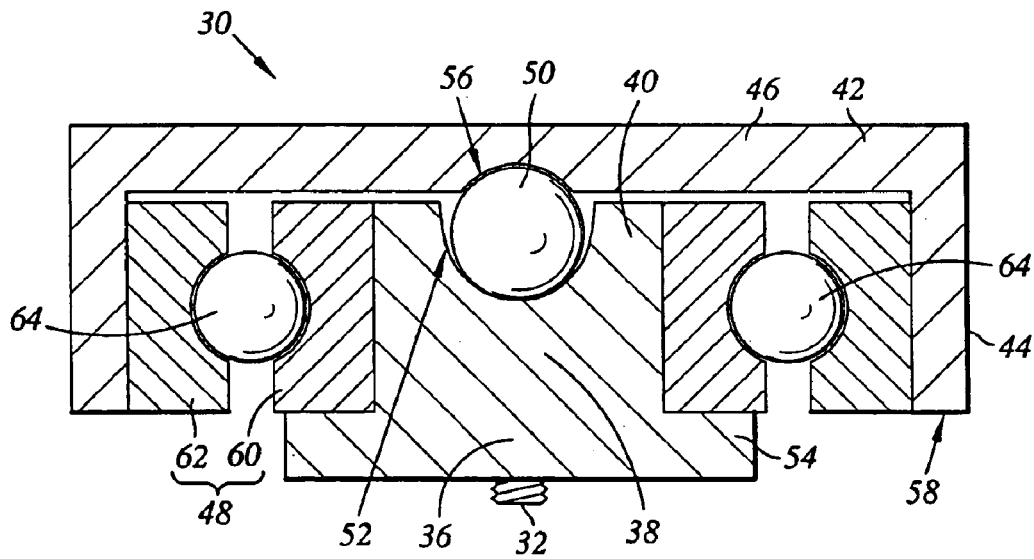
FIG. 2 is a cross sectional view of the pivot bearing cartridge of FIG. 1 including a central pivot element and a ball bearing set.

Referring now to FIG. 2, there is depicted a cross sectional view of the pivot bearing cartridge 30 as constructed in accordance with an embodiment of the present invention. The pivot bearing cartridge 30 includes a pivot shaft 36 including a shaft body 38 and a shaft distal end 40. The pivot bearing cartridge 30 further includes a cap 42 disposed about the pivot shaft 36. The cap 42 includes a cap annular body 44 and a cap closed end 46. The pivot bearing cartridge 30 further includes a ball bearing set 48 in mechanical communication with the pivot shaft 36 and the cap annular body 44. The pivot bearing cartridge 30 further includes a central pivot element 50 disposed between and in mechanical communication with the shaft distal end 40 and the cap closed end 46 for facilitating rotation of the cap 42 relative to the pivot shaft 36.

Figure 3:
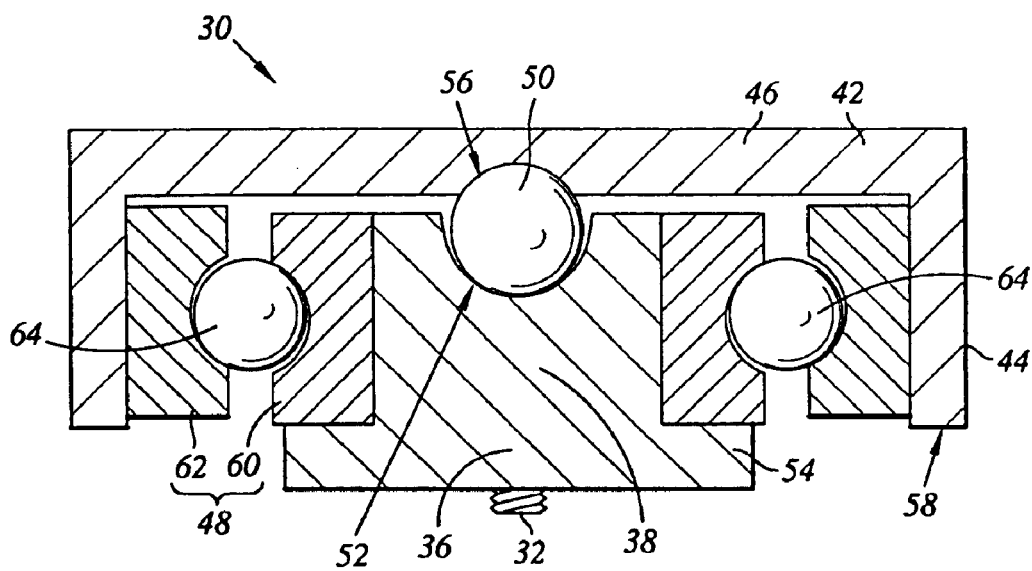
FIG. 3 is a cross sectional view of the pivot bearing cartridge FIG. 2 shown with a ball bearing set preloaded in compression.
Figure 4:
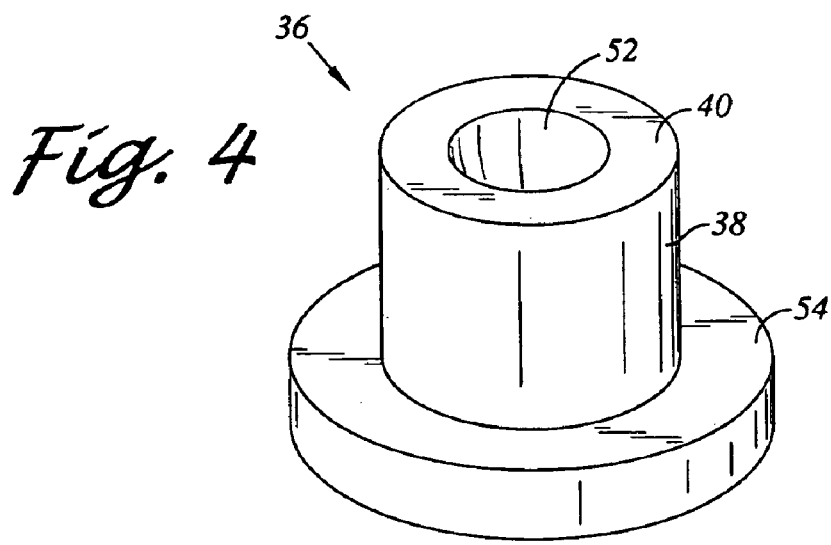
FIG. 4 is a perspective view of a pivot shaft of the pivot bearing cartridge.
Figure 5:
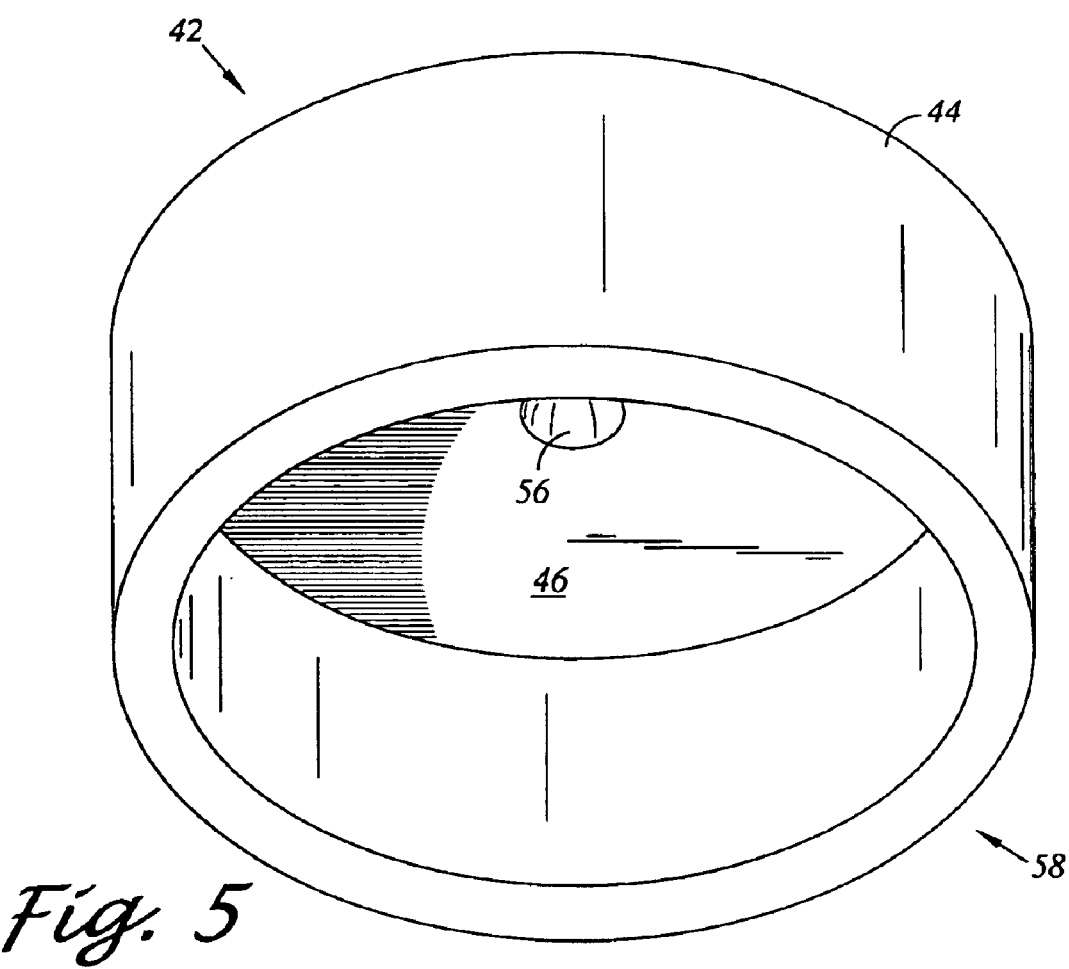
FIG. 5 is a perspective view of a cap of the pivot bearing cartridge.

In further detail, referring additionally to FIG. 4, there is depicted a perspective view of the pivot shaft 36. The pivot shaft 36 includes a shaft pivot element seating cup 52 disposed adjacent the shaft distal end 40. The central pivot element 50 is disposed against the shaft pivot element seating cup 52. The pivot shaft 36 may include a flange 54 that extends from the shaft body 38. Referring additionally to FIG. 5, there is depicted a perspective view of the cap 42. The cap 42 includes a cap pivot element seating cup 56 disposed adjacent the cap closed end 46. The cap 42 further includes a cap open end 58 opposite the cap closed end 46. The cap annular body 44 is contemplated to be sized and configured to engage the bore 24 of the actuator body 22. As such, the cap annular body 44 may be considered a pivot sleeve, in that it is the structure that interfaces with the interior of the bore 24 of the actuator body 22. In addition, the ball bearing set 48 has an inner race 60 and an outer race 62. The inner race 60 and the outer race 62 cooperatively encase a plurality of ball bearings 64. With the pivot bearing cartridge 30 in its preferable configuration, the ball bearing set 48 may be preloaded in compression as depicted in FIG. 3.

According to such embodiment depicted in FIGS. 2–5, the threaded end 32 is contemplated to be engaged with the disk drive base 12 via the threaded hole 34. In this regard, the pivot bearing cartridge 30 of such embodiment is of a fixed shaft configuration. Thus, the cap 42 is rotatable about the fixed pivot shaft 36. The inner race 60 is attached to the shaft body 38. In addition, the flange 54 may be further utilized to support the inner race 60.

Upon assembly of the pivot bearing cartridge 30, the ball bearing set 48 is initially installed about the shaft body 38 with the inner race 60 disposed about and in mechanical communication with the shaft body 38. This may be through a press fit engagement or adhesive bonding for example. Assembly of the pivot bearing cartridge 30 further provides for placement of the central pivot element 50 within the shaft pivot element seating cup 52. The cap 42 is then positioned over the pivot shaft 36 with the seated central pivot element 50. The cap annular body 44 is sized and configured to receive the ball bearing set 48, and in particular the outer race 62, through a cap open end 58. The outer race 62 and the cap annular body 44 may be then attached to each other, such as via adhesive bonding. During curing of such adhesive, the pivot bearing cartridge 30 may be placed upon a fixture such that a load is applied axially against the outer race 62 so as to urge it into the cap 42 towards the cap closed end 46. Upon curing of such adhesive the ball bearing set 48 is preloaded in compression as shown in FIG. 3. Such preloading is further contemplated to place the central pivot element 50 also in compression.

Such preloading in compression of the ball bearing set 48 and central pivot element 50 is contemplated to stabilize the cap 42 such that the cap 42 is substantially limited to rotational movement about the pivot shaft 36. This is accomplished through the use of the central pivot element 50 and the ball bearing set 48. As such, when utilized in the actuator body 22, the actuator body 22 is likewise limited in degrees of freedom to such rotational movement and thereby facilitates precise control of the positioning of the head 28 with respect to tracks of the disk 16. In this respect, the present invention allows for such stabilization of the cap 42 without the need for a second ball bearing set. Prior art pivot bearing cartridges typically utilize a pair of vertically stacked ball bearing sets disposed about a shaft for stability of a surrounding pivot sleeve. However, through the unique use of the central pivot element 50 interposed between the shaft distal end 40 and the cap closed end 46, the pivot bearing cartridge 30 of the present invention does not require a second ball bearing set. As a result, the pivot bearing cartridge 30 facilitates a vertically efficient design in comparison to prior art arrangements.

The central pivot element 50 may be formed of a variety of materials that are hard and tough, and may be formed to have a smooth surface. In this regard, it is desirable such material be sufficiently durable to withstand the repeated rotational movement of the cap 42 relative to the pivot shaft 36 under loading conditions as installed in the disk drive 10 for the life of such disk drive 10. It is contemplated that such rotational movement will result in frictional forces imparted upon the central pivot element 50 that will give rise to wear and heat generation. Suitable materials include a metal material like steel, or a jewel material like industrial crystals such as rubies, sapphires and emeralds. In addition, the central pivot element 50 may include surface hardening/smoothing treatments. In the case of the central pivot element 50 being formed of steel, the steel may undergo Nitrate surface treatments for example.

The central pivot element 50 may have a variety of shapes. In the embodiment shown, the central pivot element 50 is a ball bearing and is thus round in configuration. The central pivot element 50 is seated within the shaft pivot element seating cup 52 and the cap pivot element seating cup 56. While other shapes are contemplated, in this embodiment both are of a round or rounded shape. To alleviate friction, a lubricant may be applied to surfaces of the central pivot element 50, the shaft pivot element seating cup 52 and/or the cap pivot element seating cup 56.

According to various embodiments as more particularly described below, there are a variety of configurations with regard to the central pivot element 50 and interfacing elements at the shaft distal end 40 and the cap closed end 46. In this regard, common reference numerals are used throughout the drawings and detailed description to indicate like elements, with differences between such various embodiments indicated.

Figure 6:
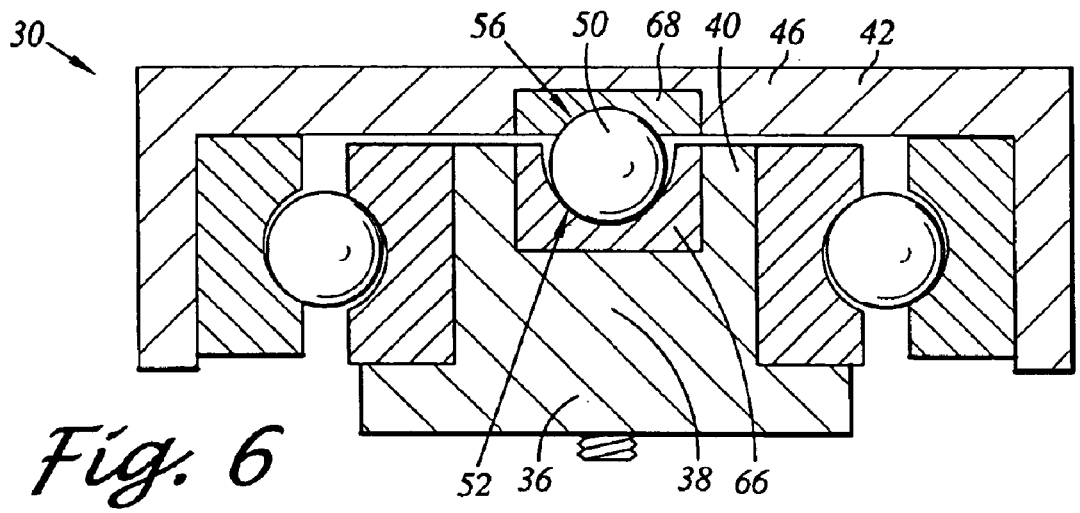
FIG. 6 is a cross sectional view similar to that of FIG. 3 of a pivot bearing cartridge according to another embodiment of the present invention including a shaft distal end insert and a cap closed end insert.

Referring now to FIG. 6 there is depicted a cross sectional view similar to that of FIG. 3 of a pivot bearing cartridge 30 according to another embodiment of the present invention. The shaft distal end 40 includes a shaft distal end insert 66. The shaft pivot element seating cup 52 is formed upon the shaft distal end insert 66. Similarly, the cap closed end 46 may include a cap closed end insert 68, with the cap pivot element seating cup 56 being formed upon the cap closed end insert 68. The shaft distal end insert 66 and the cap closed end insert 68 may be formed of materials respectively different than that of the pivot shaft 36 and the cap 42. For example, the shaft distal end insert 66 and the cap closed end insert 68 may be formed of higher strength materials than those materials utilized for the pivot shaft 36 or the cap 42.

Figure 7:
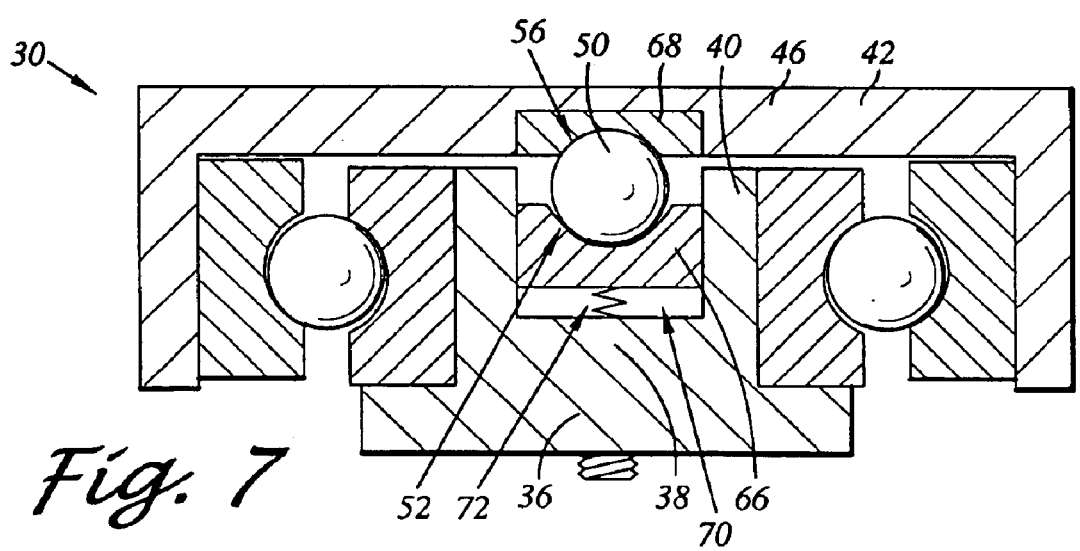
FIG. 7 is a cross sectional view similar to that of FIG. 6 of a pivot bearing cartridge according to another embodiment of the present invention with the shaft distal end insert being formed to move along a longitudinal axis and biased by a mechanical spring.

Referring now to the embodiment shown in FIG. 7, there is depicted a cross sectional view similar to that of FIG. 6 of a pivot bearing cartridge 30. In this embodiment, the shaft distal end insert 66 is formed to move along a longitudinal axis of the pivot shaft 36 and is biased against the central pivot element 50. The pivot shaft 36 may include a central channel 70 that is formed to receive the shaft distal end insert 66. The pivot shaft 36 may include a spring, such as a mechanical spring 72, in mechanical communication with the shaft body 38 and the shaft distal end insert 66 for biasing the shaft distal end insert 66 against the central pivot element 50. Similarly, though not shown, it is contemplated that the cap 42 may include a central channel similar to central channel 70 to facilitate movement of the cap closed end insert 68 as biased against the central pivot element 50 through the use of a spring such as similar to mechanical spring 52.

Figure 8:
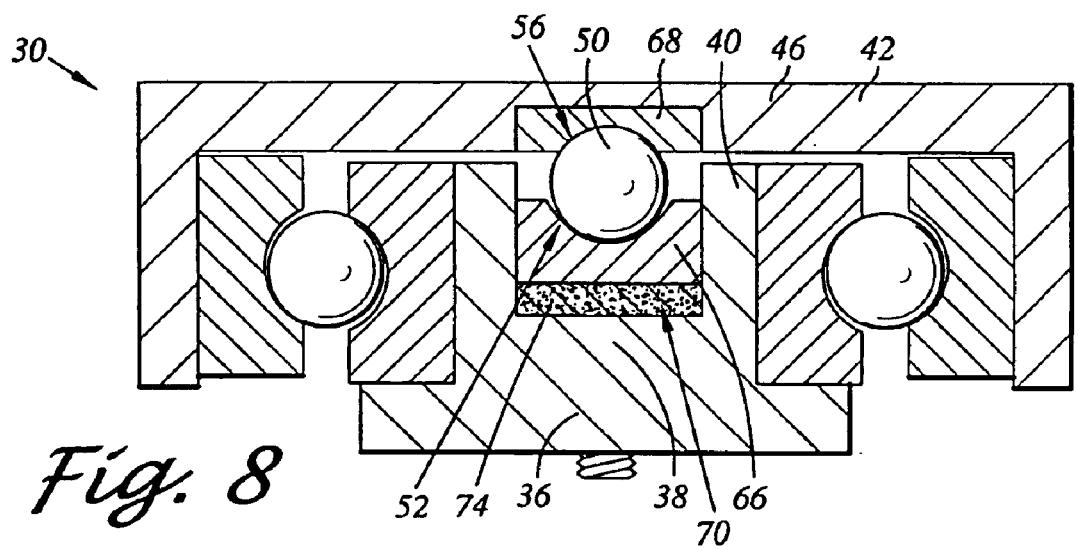
FIG. 8 is a cross sectional view similar to that of FIG. 7 of a pivot bearing cartridge according to another embodiment of the present invention including a damping element substituted for the mechanical spring.

Referring now to the embodiment shown in FIG. 8, there is depicted a cross sectional view similar to that of FIG. 7 of a pivot bearing cartridge 30. In this embodiment, a damping element 74 is disposed within the central channel 70. The damping element 74 is disposed in mechanical communication with the shaft body 38 and the shaft distal end insert 66 for damping movement of the shaft distal end insert 66. For example, the damping element 74 may be formed of a rubber material. Moreover, such a rubber material when preloaded in compression may additionally function as another form of a spring for biasing the shaft distal end insert 66 against the central pivot element 50. Similarly, though not shown, it is contemplated that the cap 42 may include a damping element, such as similar to damping element 74, for damping movement of the cap closed end insert 68 to the extent that the same is configured to move.

Figure 9:
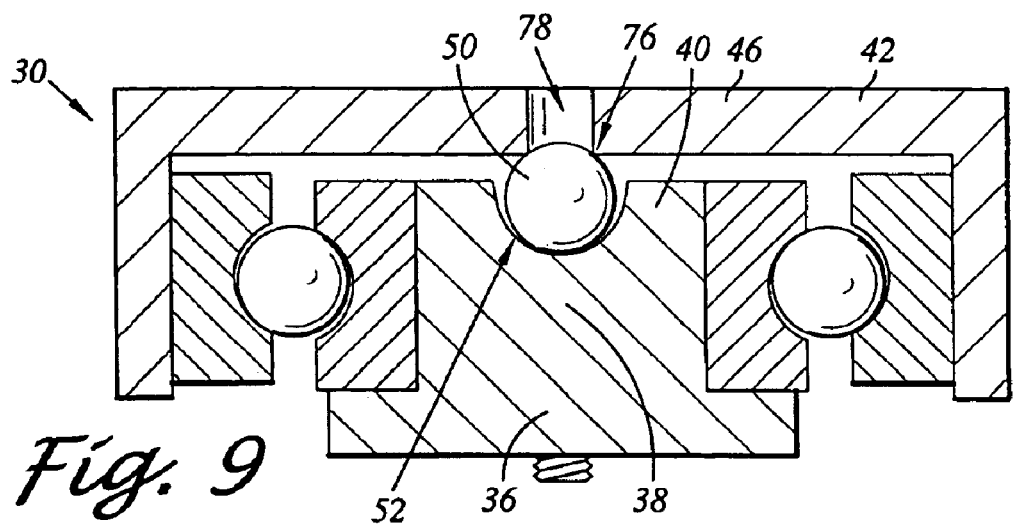
FIG. 9 is a cross sectional view similar to that of FIG. 3 of a pivot bearing cartridge according to another embodiment of the present invention with the central pivot element seated against an opening of the cap closed end.

Referring now to the embodiment shown in FIG. 9, there is depicted a cross sectional view similar to that of FIG. 3 of a pivot bearing cartridge 30. According to this embodiment, there is provided a cap pivot element seating cup 76. The cap pivot element seating cup 76 is disposed at an opening 78 formed in at the cap closed end 46 and has an opening diameter less that a pivot element diameter of the central pivot element 50. In this regard, the central pivot element 50 is configured to be seated at a rim of the opening 78. Similarly, though not shown, it is contemplated that the pivot shaft 36 may include an opening similar to the opening 78 forming the cap pivot element seating cup 76 for seating the central pivot element 50 adjacent the shaft distal end 40. In another arrangement, the opening 78 may be utilized for introducing an adhesive to the central pivot element 50 for attaching the central pivot element 50 to the cap 42.

Figure 10:
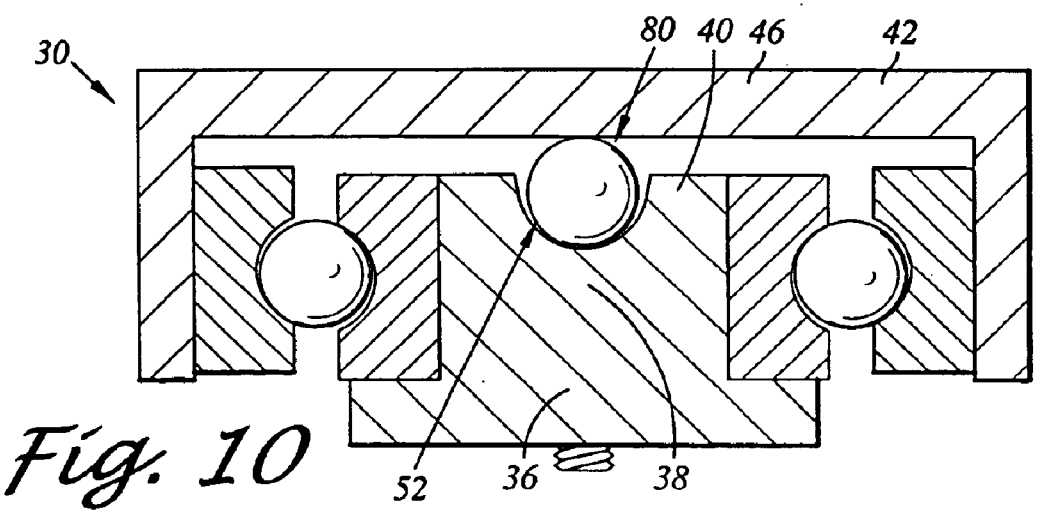
FIG. 10 is a cross sectional view similar to that of FIG. 9 of a pivot bearing cartridge according to another embodiment of the present invention with the central pivot element against a cap flat surface.

Referring now to the embodiment shown in FIG. 10, there is depicted a cross sectional view similar to that of FIG. 9 of a pivot bearing cartridge 30. According to this embodiment, the cap 42 includes a cap flat surface 80 adjacent the cap closed end 46. The central pivot element 50 is disposed against the cap flat surface 80.

Figure 11:
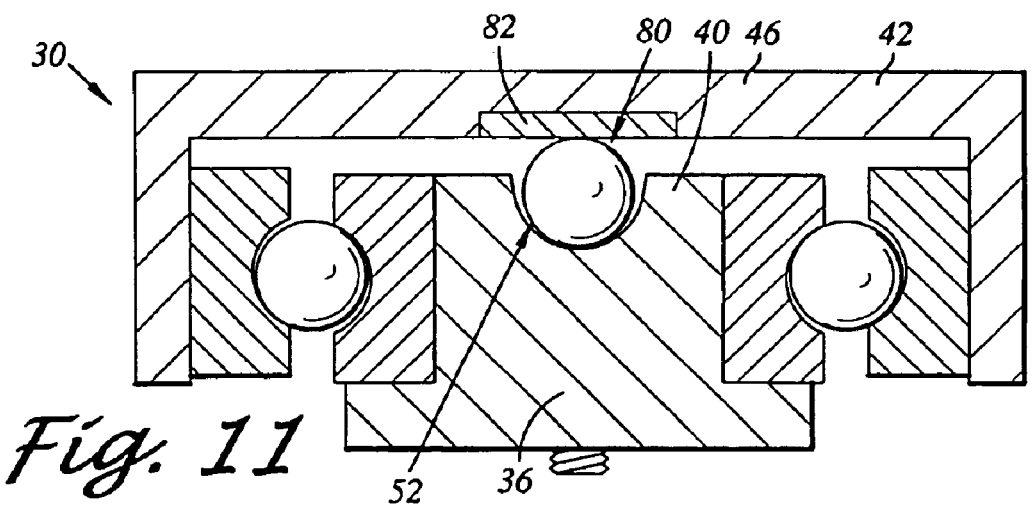
FIG. 11 is a cross sectional view similar to that of FIG. 10 of a pivot bearing cartridge according to another embodiment of the present invention with the cap flat surface formed upon a cap closed end insert.

Referring now to the embodiment shown in FIG. 11, there is depicted a cross sectional view similar to that of FIG. 10 of a pivot bearing cartridge 30. According to this embodiment, the cap flat surface 80 formed upon a cap closed end insert 82 which is disposed adjacent the cap closed end 46. Though not shown, the cap closed end insert 82 may further be configured to move with respect to a longitudinal axis of the central pivot shaft 50 and may have a spring and/or damping elements such as similar to the spring 72 and damping element 74 of the embodiments shown in FIGS. 7 and 8 with regard to the pivot shaft 36.

Figure 12:
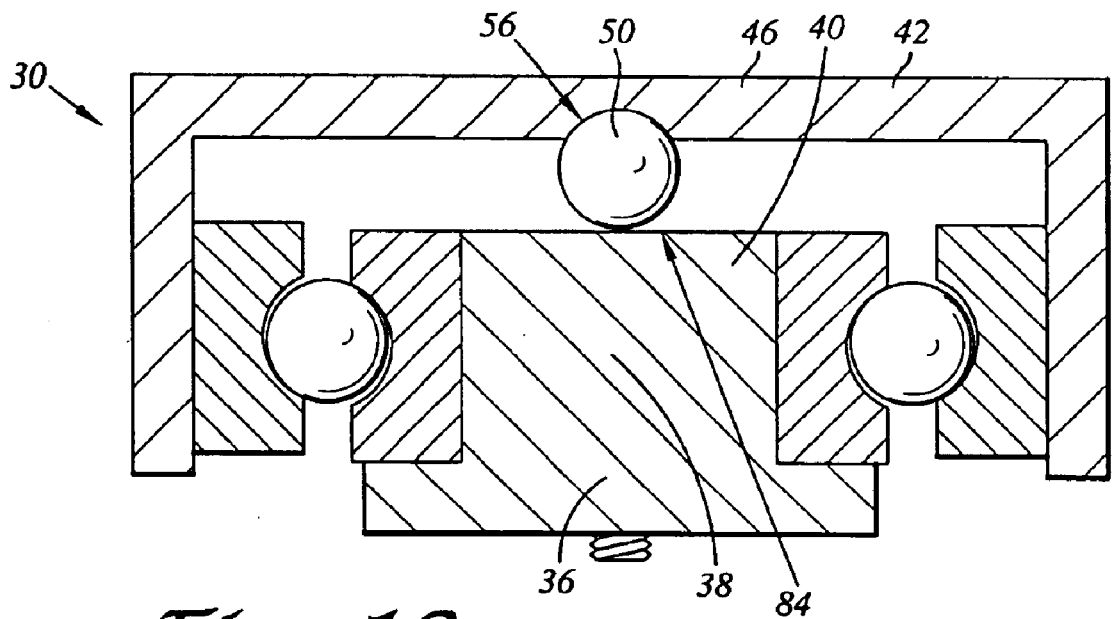
FIG. 12 is a cross sectional view similar to that of FIG. 3 of a pivot bearing cartridge according to another embodiment of the present invention with the central pivot element against a shaft flat surface.

Referring now to the embodiment shown in FIG. 12, there is depicted a cross sectional view similar to that of FIG. 3 of a pivot bearing cartridge 30. According to this embodiment, the pivot shaft 36 includes a shaft flat surface 84 adjacent the shaft distal end 40. The central pivot element 50 is disposed against the shaft flat surface 84.

Figure 13:
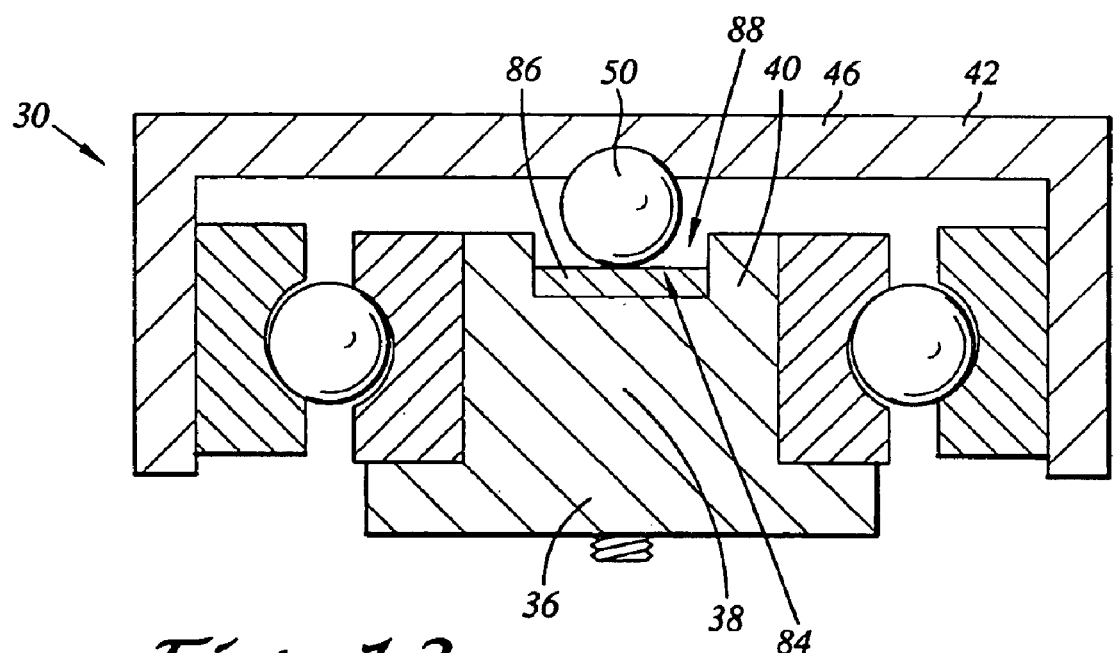
FIG. 13 is a cross sectional view similar to that of FIG. 12 of a pivot bearing cartridge according to another embodiment of the present invention with the shaft flat surface formed upon a shaft distal end insert.

Referring now to the embodiment shown in FIG. 13, there is depicted a cross sectional view similar to that of FIG. 12 of a pivot bearing cartridge 30. According to this embodiment, the shaft flat surface 84 is formed upon a shaft distal end insert 86. In addition, a central channel 88 may be formed in the shaft body 38 for receiving the shaft distal end insert 86. The central channel 88 may be formed such that the shaft flat surface 84 is inset at the shaft distal end 40. In this regard, the relative vertical positioning of the central pivot element 50 may be adjusted.

Figure 14:
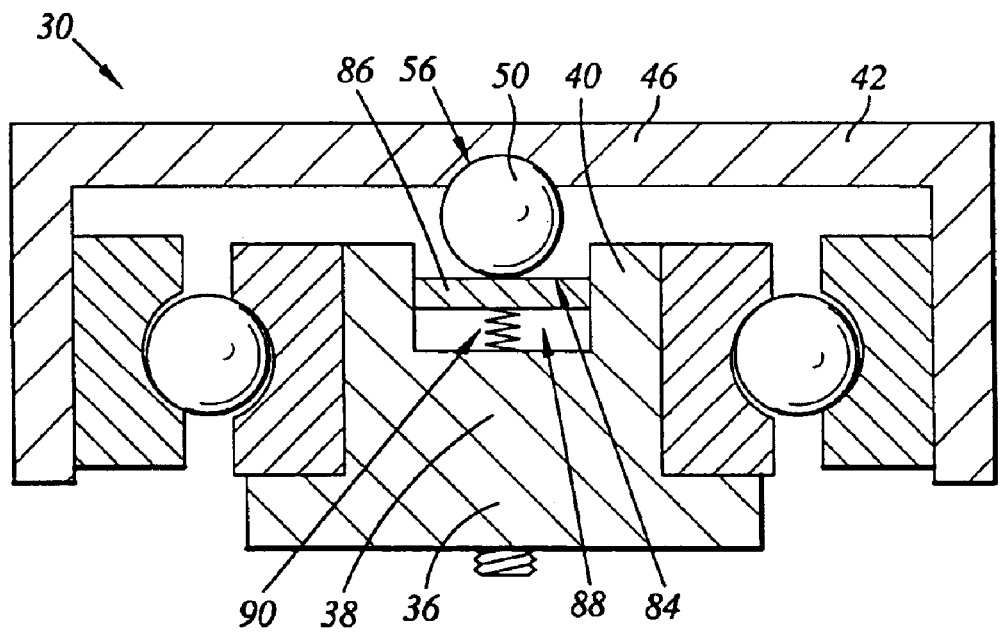
FIG. 14 is a cross sectional view similar to that of FIG. 13 of a pivot bearing cartridge according to another embodiment of the present invention with the shaft distal end insert being formed to move along a longitudinal axis and biased by a mechanical spring.

Referring now to the embodiment shown in FIG. 14, there is depicted a cross sectional view similar to that of FIG. 13 of a pivot bearing cartridge 30. According to this embodiment the shaft distal end insert 86 is formed to move along a longitudinal axis of the pivot shaft 36 within the central channel 88 and is biased against the central pivot element 50 by a mechanical spring 90. Other spring arrangements are contemplated. Further, a damping member may be included similar to damping member 74 of the embodiment shown in FIG. 8.

Figure 15:
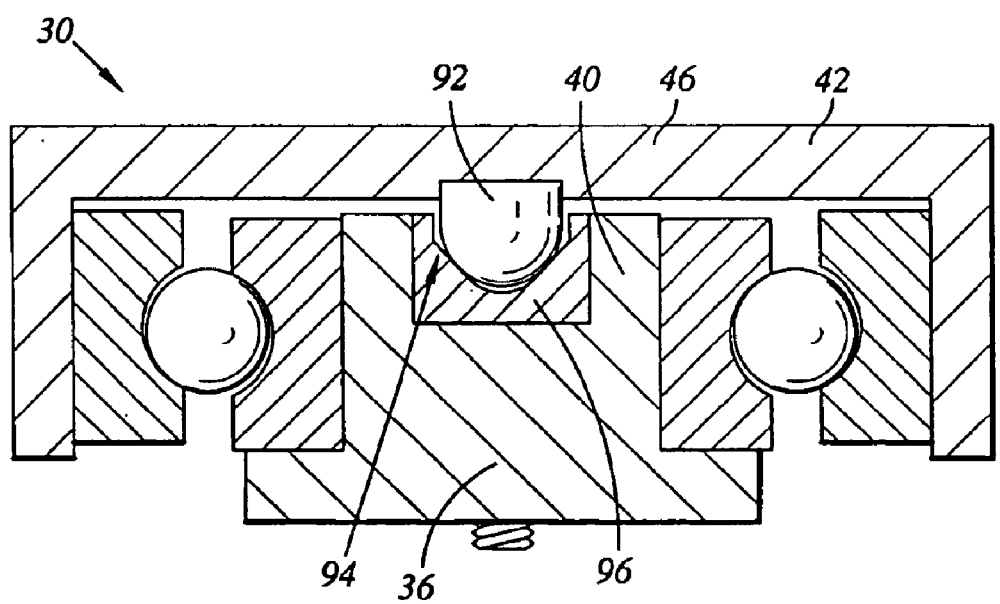
FIG. 15 is a cross sectional view similar to that of FIG. 3 of a pivot bearing cartridge according to another embodiment of the present invention with a conical shaped central pivot element attached to the cap and including a shaft distal end insert.

Referring now to the embodiment shown in FIG. 15, there is depicted a cross sectional view similar to that of FIG. 3 of a pivot bearing cartridge 30. According to this embodiment, there is provided a central pivot element 92 that is generally conical shaped. Further, the central pivot element 92 may even have geometric shaping. In this regard, the central pivot element 92 need not be round such as the pivot element 50 shown in the preceding FIGS. 2–14. Moreover, the central pivot element 92 may be attached to the cap 42 at the cap closed end 46. The pivot shaft 36 may include a shaft pivot element seating cup 94 that is geometrically shaped for receiving the central pivot element 92. Although the shaft pivot element seating cup 94 is geometric in configuration, it nonetheless may be generally conical shaped as shown. In addition, the shaft pivot element seating cup 94 may be formed upon a shaft distal end insert 96.

Figure 16:
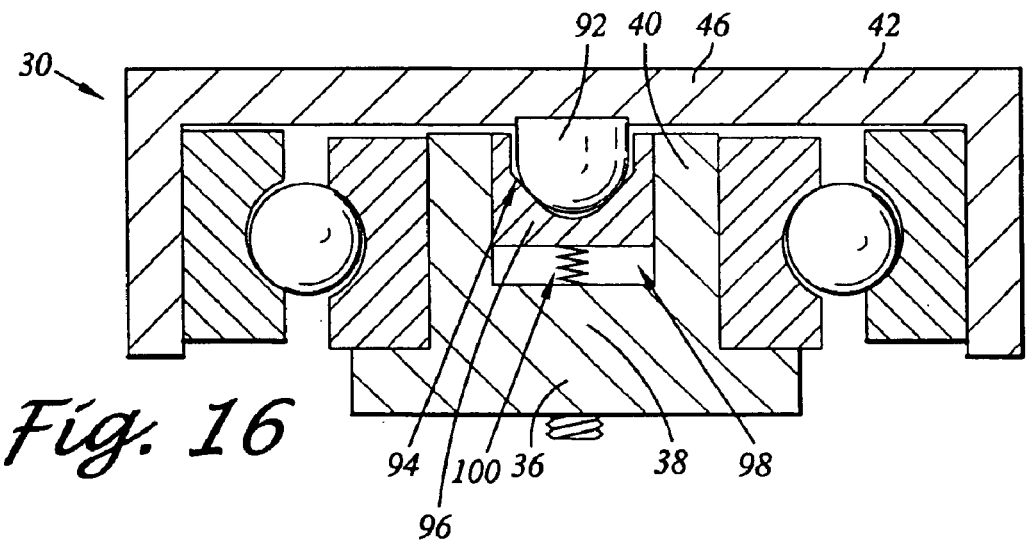
FIG. 16 is a cross sectional view similar to that of FIG. 15 of a pivot bearing cartridge according to another embodiment of the present invention with the shaft distal end insert being formed to move along a longitudinal axis and biased by a mechanical spring.

Referring now to the embodiment shown in FIG. 16, there is depicted a cross sectional view similar to that of FIG. 15 of a pivot bearing cartridge 30. According to this embodiment, the shaft distal end insert 96 is formed to move along a longitudinal axis of the pivot shaft 36 and is biased against the central pivot element 92 by a mechanical spring 100 disposed within a central channel 98 formed in the shaft body 38. Other spring arrangements are contemplated. Further, a damping member may be included similar to the damping member 74 of the embodiment shown in FIG. 8.

Figure 17:
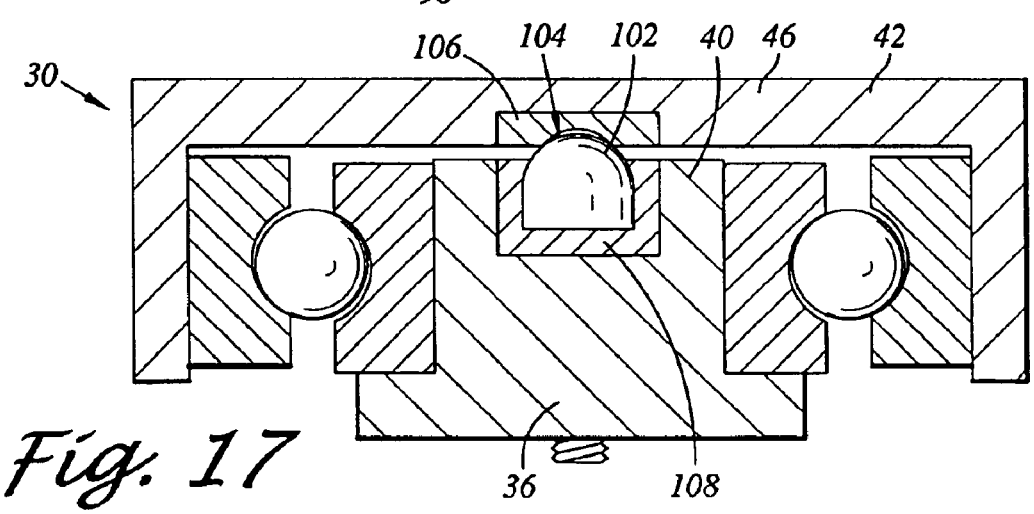
FIG. 17 is a cross sectional view similar to that of FIG. 3 of a pivot bearing cartridge according to another embodiment of the present invention with a conical shaped central pivot element attached to the shaft distal end insert and including a cap closed end insert.

Referring now to the embodiment shown in FIG. 17, there is depicted a cross sectional view similar to that of FIG. 3 of a pivot bearing cartridge 30. According to this embodiment, there is provided a central pivot element 102 similar in shape to the central pivot element 92 of the embodiment shown in FIG. 16. However, in the present embodiment, the central pivot element 102 is attached to the pivot shaft 36 via a shaft distal end insert 108. Further, the cap 42 includes a cap closed end insert 104 which has a cap pivot shaft seating cup 104 formed upon the cap closed end insert 104 for receiving the central pivot element 102.

Figure 18:
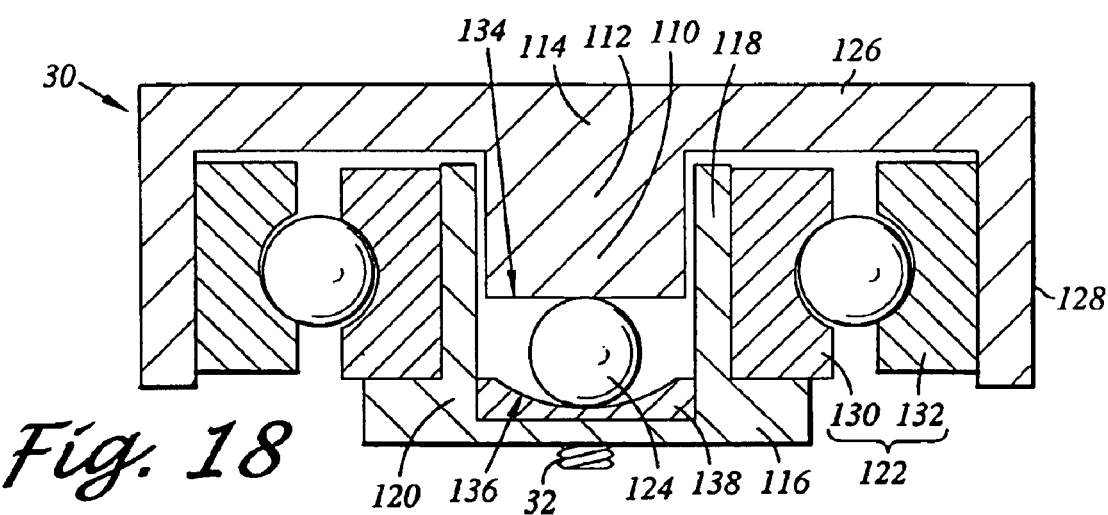
FIG. 18 is a cross sectional view similar to that of FIG. 3 of a pivot bearing cartridge according to another embodiment of the present invention with a fixed shaft arrangement.

Referring now to the embodiment shown in FIG. 18, there is depicted a cross sectional view similar to that of FIG. 3 of a pivot bearing cartridge 30. According to this embodiment, the pivot bearing cartridge 30 is of a rotating shaft arrangement. The pivot bearing cartridge 30 includes a pivot shaft 110 including a shaft body 112 and a shaft distal end 114. The pivot bearing cartridge 30 further includes a cap 116 disposed about the pivot shaft 110. The cap 116 includes a cap annular body 118 and a cap closed end 120. The pivot bearing cartridge 30 further includes a ball bearing set 122 in mechanical communication with the pivot shaft 110 and the cap annular body 118. The pivot bearing cartridge 30 further includes a central pivot element 124 disposed between and in mechanical communication with the shaft distal end 114 and the cap closed end 120 for facilitating rotation of the cap 116 relative to the pivot shaft 110.

In the embodiment shown, the pivot bearing cartridge 30 may further include a shaft base 126 and an outer annular member 128 extends from the shaft base 126 and about the cap annular body 118. The pivot shaft 110 extends from the shaft base 126. The ball bearing set 122 is in mechanical communication with the pivot shaft 110 via the outer annular member 128 and the shaft base 126. In this regard, the ball bearing set 122 includes an inner race 130 and an outer race 132. The inner race 130 is attached about the cap annular body 118, and the outer race 132 is attached within the outer annular member 128. The outer annular member 128 is configured to be received within the bore 24 of the actuator body 22. As such, the outer annular member 128 is analogous to a pivot sleeve of a conventional pivot bearing cartridge design. In this rotating shaft arrangement, the threaded end 32 of the pivot bearing cartridge 30 extends from the cap 116. Thus, the cap 116 is attached to the disk drive base 12 and the pivot shaft 110 is configured to rotate within the cap 116.

The shaft distal end 114 may include a shaft flat surface 134 with the central pivot element 124 disposed against the shaft flat surface 134. In addition, though not shown, the shaft flat surface 134 may be formed upon a shaft distal end insert such as the shaft distal end insert 86 of the embodiment shown in FIG. 14. The pivot shaft 110 may include a central channel similar to central channel 88 to facilitate movement of such a shaft distal end insert as biased against the central pivot element 124 through the use of a spring such as similar to mechanical spring 90. A damping element may be provided similar to the damping element 74 of the embodiment shown in FIG. 8. Further, in an alternate embodiment, rather than inclusion of a shaft flat surface 134 as shown, the shaft distal end 114 may include a shaft pivot element seating cup such as similar in configuration to the shaft pivot element seating cup 52 of the embodiment shown in FIG. 8. Moreover, the central pivot element 124 may be attached to the pivot shaft 110 such as with the embodiment shown in FIG. 17.

A cap pivot element seating cup 136 may be provided for receiving the central pivot element 124. The cap pivot element seating cup 136 may be formed upon a cap closed end insert 138. Though not shown, the cap 116 may include a central channel similar to central channel 70 of the embodiment shown in FIG. 7 to facilitate movement of the cap closed end insert 138 as biased against the central pivot element 124 through the use of a spring such as similar to mechanical spring 72. Further a damping element may be provided similar to the damping element 74 of the embodiment shown in FIG. 8. In an alternate arrangement, the cap closed end 120 may include a flat surface similar to the cap flat surface 80 for supporting the central pivot element 124. Moreover, the central pivot element 124 may be attached to the cap 116 such as the embodiment shown in FIG. 16.

What is claimed is:

1. A pivot bearing cartridge for use in a head stack assembly, the pivot bearing cartridge comprising:
   a pivot shaft including a shaft body and a shaft distal end;
   a cap disposed about the pivot shaft, the cap including a cap annular body and a cap closed end;
   a single ball bearing set in mechanical communication with the pivot shaft and the cap annular body; and a single central pivot element disposed between and in mechanical communication with the shaft distal end and the cap closed end for facilitating rotation of the cap relative to the pivot shaft;

wherein the pivot shaft includes a shaft distal end insert attached to the pivot shaft adjacent the shaft distal end, the shaft distal end insert is formed to move along a longitudinal axis of the pivot shaft and biased against the central pivot element, the pivot shaft includes a damping element in mechanical communication with the shaft body and the shaft distal end insert for damping movement of the shaft distal end insert.

2. The pivot bearing cartridge of claim 1, wherein the damping element is preloaded in compression for biasing the shaft distal end insert against the central pivot element.

3. The pivot bearing cartridge of claim 1, wherein the pivot shaft includes a shaft pivot element seating cup adjacent the shaft distal end, the central pivot element is disposed against the shaft pivot element seating cup.

4. The pivot bearing cartridge of claim 3, wherein the shaft pivot element seating cup is an opening having an opening diameter less than a pivot element diameter of the central pivot element.

5. The pivot bearing cartridge of claim 1, wherein the cap includes a cap pivot element seating cup adjacent the cap closed end, the central pivot element is disposed against the cap pivot element seating cup.

6. The pivot bearing cartridge of claim 5, wherein the cap includes a cap closed end insert attached to the cap adjacent the cap closed end, the cap pivot element seating cup is formed in the cap closed end insert.

7. The pivot bearing cartridge of claim 1, wherein the ball bearing set includes an inner race and an outer race, the inner race is attached about the shaft body and the outer race is attached within the cap annular body.

8. A disk drive comprising:

a disk drive base;

a head stack assembly rotatably coupled to the disk drive base and including:
an actuator body defining a bore;
a pivot bearing cartridge positioned in the bore and coupled to the disk drive base for allowing the head stack assembly to pivot relative to the disk drive base, the pivot bearing cartridge including:

a pivot shaft coupled to the disk drive base and including a shaft body and a shaft distal end;

a cap disposed about the pivot shaft, the cap including a cap annular body and a cap closed end;

a single ball bearing set in mechanical communication with the pivot shaft and the cap annular body; and a single central pivot element disposed between and in mechanical communication with the shaft distal end and the cap closed end for facilitating rotation of the cap relative to the pivot shaft;

wherein the pivot shaft includes a shaft distal end insert attached to the pivot shaft adjacent the shaft distal end, the shaft distal end insert is formed to move along a longitudinal axis of the pivot shaft and biased against the central pivot element, the pivot shaft includes a damping element in mechanical communication with the shaft body and the shaft distal end insert for damping movement of the shaft distal end insert.

9. The disk drive of claim 8, wherein the damping element is preloaded in compression for biasing the shaft distal end inert against the central pivot element.

10. The disk drive of claim 8, wherein the pivot shaft includes a shaft pivot element seating cup adjacent the shaft distal end, the central pivot element is disposed against the shaft pivot element seating cup.

11. The disk drive of claim 10, wherein the shaft pivot element seating cup is an opening having an opening diameter less than a pivot element diameter of the central pivot element.

12. The disk drive of claim 8, wherein the cap includes a cap pivot element seating cup adjacent the cap closed end, the central pivot element is disposed against the cap pivot element seating cup.

13. The disk drive of claim 12, wherein the cap includes a cap closed end insert attached to the cap adjacent the cap closed end, the cap pivot element seating cup is formed in the cap closed end insert.

14. The disk drive of claim 8, wherein the ball bearing set includes an inner race and an outer race, the inner race is attached about the shaft body and the outer race is attached within the cap annular body.

\* \* \* \* \*